US011360593B2

United States Patent
Lee et al.

(10) Patent No.: US 11,360,593 B2
(45) Date of Patent: Jun. 14, 2022

(54) TOUCH PANEL

(71) Applicant: Au Optronics Corporation, Hsinchu (TW)

(72) Inventors: Chia-Chi Lee, Hsinchu (TW); Sheng-Chin Fan, Hsinchu (TW); Che-Min Lin, Hsinchu (TW); Chun-Ru Huang, Hsinchu (TW); Chen-Hao Chiang, Hsinchu (TW); Yu-Hsin Hsieh, Hsinchu (TW); Zeng-De Chen, Hsinchu (TW)

(73) Assignee: Au Optronics Corporation, Hsinchu (TW)

( * ) Notice: Subject to any disclaimer, the term of this patent is extended or adjusted under 35 U.S.C. 154(b) by 0 days.

(21) Appl. No.: 16/934,004

(22) Filed: Jul. 20, 2020

(65) Prior Publication Data
US 2021/0255722 A1 Aug. 19, 2021

(30) Foreign Application Priority Data
Feb. 18, 2020 (TW) .................. 109105175

(51) Int. Cl.
*G06F 3/041* (2006.01)
*G02F 1/1362* (2006.01)
*G02F 1/1368* (2006.01)
*G06F 3/044* (2006.01)

(52) U.S. Cl.
CPC .......... *G06F 3/0412* (2013.01); *G02F 1/1368* (2013.01); *G02F 1/136286* (2013.01); *G06F 3/044* (2013.01); *G02F 2201/121* (2013.01); *G02F 2201/123* (2013.01); *G06F 2203/04111* (2013.01)

(58) Field of Classification Search
None
See application file for complete search history.

(56) References Cited

U.S. PATENT DOCUMENTS

| 9,123,592 | B1 * | 9/2015 | Zhang ............... G02F 1/136286 |
| 9,323,111 | B2 | 4/2016 | Um et al. |
| 9,904,424 | B2 | 2/2018 | Lee et al. |
| 2014/0168555 | A1 | 6/2014 | Um et al. |

(Continued)

FOREIGN PATENT DOCUMENTS

| CN | 102998859 | 3/2013 |
| TW | M514052 | 12/2015 |

*Primary Examiner* — Christopher R Lamb
(74) *Attorney, Agent, or Firm* — JCIPRNET

(57) ABSTRACT

A touch panel includes a substrate, touch signal lines, sub-pixels, touch electrode groups, and at least one common signal array. The touch signal lines and the sub-pixels are located on substrate. Each of the sub-pixels includes a switch element and a pixel electrode. The switch element is electrically connected to a corresponding scan line and a corresponding data line. The touch electrode groups include touch electrodes. The touch electrodes overlap the pixel electrodes of the sub-pixels. Each of the touch electrode groups is electrically connected to a corresponding one of the touch signal lines. The common signal array includes common electrodes. Each of the common electrodes overlaps at least one of the scan line and the data line. The number of the sub-pixels overlapped by the common signal array is greater than the number of the sub-pixels overlapped by each of the touch electrode groups.

20 Claims, 17 Drawing Sheets

(56) References Cited

U.S. PATENT DOCUMENTS

| | | |
|---|---|---|
| 2016/0048267 A1* | 2/2016 | Lee .................. G06F 3/0443 |
| | | 345/173 |
| 2016/0109979 A1 | 4/2016 | Lee et al. |
| 2017/0123527 A1* | 5/2017 | Chuang .............. G09G 3/3655 |
| 2018/0181242 A1 | 6/2018 | Mizuhashi et al. |
| 2019/0101998 A1 | 4/2019 | Peng et al. |
| 2019/0187831 A1* | 6/2019 | Liu .................. G02F 1/1362 |

* cited by examiner

TOUCH PANEL

CROSS-REFERENCE TO RELATED APPLICATION

This application claims the priority benefit of Taiwan patent application serial no. 109105175, filed on Feb. 18, 2020. The entirety of the above-mentioned patent application is hereby incorporated by reference here and made a part of this specification.

BACKGROUND

Technical Field

The disclosure relates to a touch panel, and particularly to a touch panel including a plurality of sub-pixels.

Description of Related Art

An in-cell touch display panel is made by applying a technology that integrates a touch sensing device into a liquid crystal display panel. The touch electrodes of the touch sensing device are directly formed on a pixel circuit substrate of the liquid crystal display panel or on a color filter substrate. Therefore, compared to the out-cell touch display panel where an additional touch panel is adhered to a display panel, the in-cell touch display panel has a relatively small thickness. However, since the distance between the touch electrodes and the pixel circuit in the in-cell touch display panel is relatively short, signals on the pixel circuit are prone to affecting the touch electrodes, thus resulting in distortion of touch signals.

SUMMARY

The disclosure provides a touch panel, which can reduce a parasitic capacitance between a data line and a touch electrode or a parasitic capacitance between a scan line and a touch electrode.

At least one embodiment of the disclosure provides a touch panel. The touch panel includes a substrate, a plurality of touch signal lines, a plurality of sub-pixels, a plurality of touch electrode groups, and at least one common signal array. The touch signal lines and the sub-pixels are located on the substrate. Each of the sub-pixels includes a switch element and a pixel electrode, the switch element is electrically connected to a corresponding scan line and a corresponding data line, and the pixel electrode is electrically connected to the switch element. The touch electrode groups include a plurality of touch electrodes. The touch electrodes overlap the pixel electrodes of the sub-pixels. Each of the touch electrode groups is electrically connected to at least one corresponding to touch signal line. The at least one common signal array includes a plurality of common electrodes. Each of the common electrodes overlaps at least one of the corresponding scan line and the corresponding data line. The number of the sub-pixels overlapped by the at least one common signal array is greater than the number of the sub-pixels overlapped by each of the touch electrode groups.

Several exemplary embodiments accompanied with figures are described in detail below to further describe the disclosure in details.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

Figure 1:
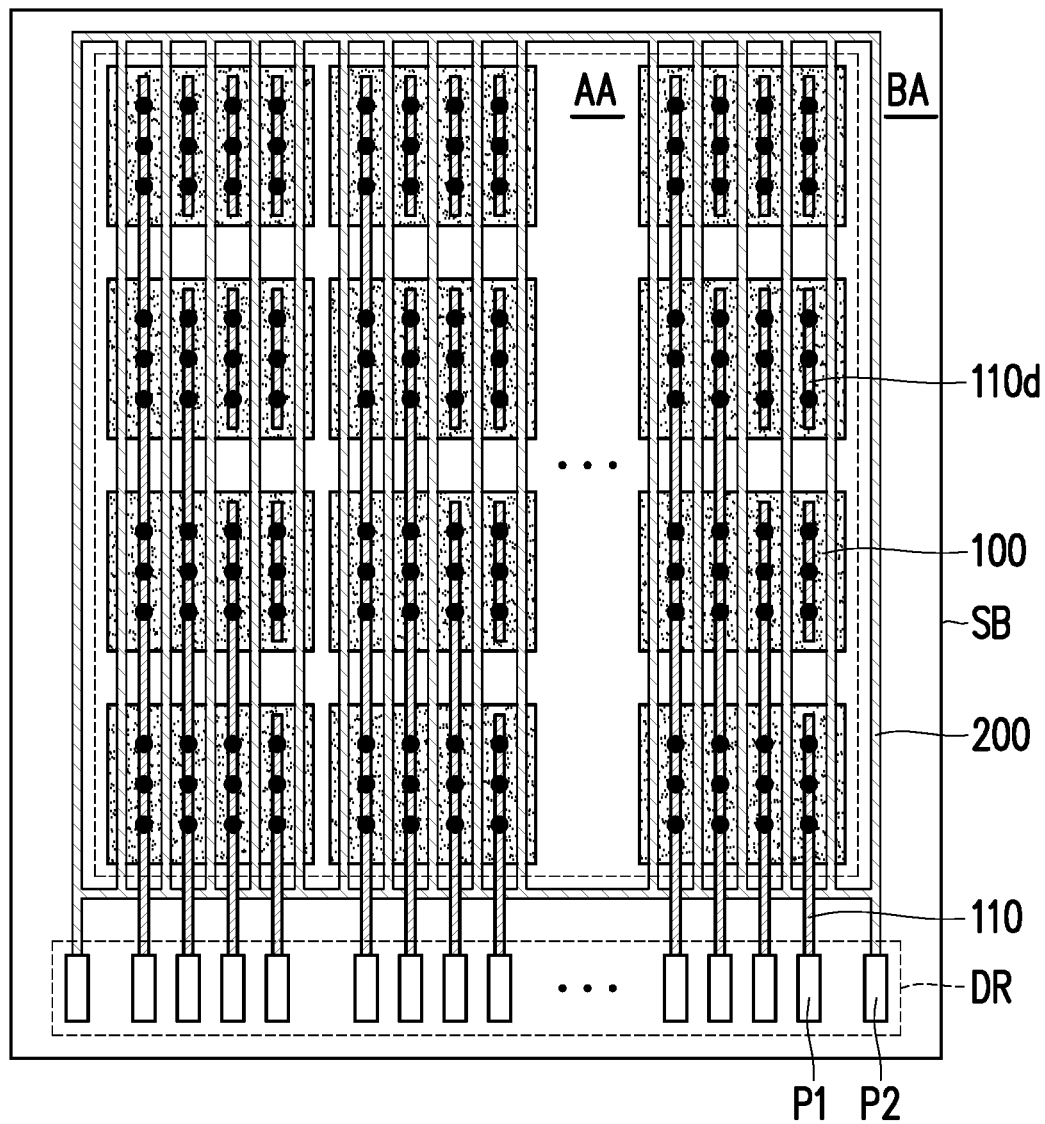
FIG. 1 is a schematic top view of a touch panel according to an embodiment of the disclosure.

FIG. 1 is a schematic top view of a touch panel according to an embodiment of the disclosure.

With reference to FIG. 1, a touch panel 10 includes a substrate SB, a plurality of touch signal lines 110, a plurality of sub-pixels (not shown in FIG. 1), a plurality of touch electrode groups 100, at least one common signal array 200, and a driving circuit DR. In some embodiments, the touch panel 10 is adapted to a liquid crystal display device, and the liquid crystal display device further includes a color filter substrate (not shown) and a liquid crystal layer positioned between the color filter substrate and the touch panel 10 (not shown).

In some embodiments, the touch panel 10 is an in-cell touch panel and has a display region AA and a peripheral region BA that is located on at least one side of the display region AA. The driving circuit DR is disposed in the peripheral region BA and includes at least one chip bonded to the substrate SB. The sub-pixels are disposed in the display region AA.

The touch electrode groups 100 are disposed in the display region AA and are structurally separated from each other. Each of the touch electrode groups 100 includes a plurality of touch electrodes overlapping the sub-pixels, and the touch electrodes in each of the touch electrode groups 100 are electrically connected to each other.

Each of the touch electrode groups 100 is electrically connected to a first signal output terminal P1 of the driving circuit DR located in the peripheral region BA through the corresponding touch signal line 110. In the embodiment, each of the touch electrode groups 100 is electrically connected to a corresponding touch signal line 110, and each of the touch signal lines 110 is electrically connected to one corresponding first signal output terminal P1, which should however not be construed as a limitation in the disclosure. In other embodiments, each of the touch electrode groups 100 is electrically connected to at least one of the touch signal lines 110. The same touch signal is applied to the touch signal lines 110 connected to the same touch electrode group 100. Each of the touch electrode groups 100 is electrically connected to different touch signal lines 110, respectively. In other words, the number of the first signal output terminals P1 of the driving circuit DR is at least equal to the number of the touch electrode groups 100.

In some embodiments, dummy signal lines 110d overlap parts of the touch electrode groups 100, whereby a difference in an aperture rate of the sub-pixels corresponding to different touch electrode groups 100 may be reduced, and the dummy signal lines 110d are not electrically connected to the driving circuit DR nor connected to the touch electrode groups 100. In the embodiment, the dummy signal lines 110d are electrically connected to the touch electrode groups 100; however, the dummy signal lines 110d are separated from the driving circuit DR.

The common signal array 200 is at least disposed in the display region AA. In the embodiment, the common signal array 200 is not only disposed in the display region AA but also extended to the peripheral region BA from the display region AA. The common signal array 200 and the touch electrode groups 100 are structurally separated from each other. The common signal array 200 includes a plurality of common electrodes overlapping the sub-pixels, and the common electrodes are electrically connected to each other. In the embodiment, the common signal array 200 extend across the touch electrode groups 100, and therefore the number of the sub-pixels overlapped by the common signal array 200 is greater than the number of the sub-pixels overlapped by each of the touch electrode groups 100.

The common signal array 200 is electrically connected to a second signal output terminal P2 of the driving circuit DR located in the peripheral region BA. In other words, the common signal array 200 and the touch electrode groups 100 are electrically connected to the driving circuit DR, respectively. In the embodiment, the number of the second signal output terminals P2 is less than the number of the first signal output terminals P1. Therefore, the number of output terminals required by the driving circuit DR may be reduced. Although the touch panel 10 provided in the embodiment exemplarily includes one common signal array 200, the disclosure is not limited thereto. In other embodiments, the touch panel 10 includes a plurality of common signal array 200, while the number of the common signal arrays 200 is less than the number of the touch electrode groups 100.

Figure 2A:
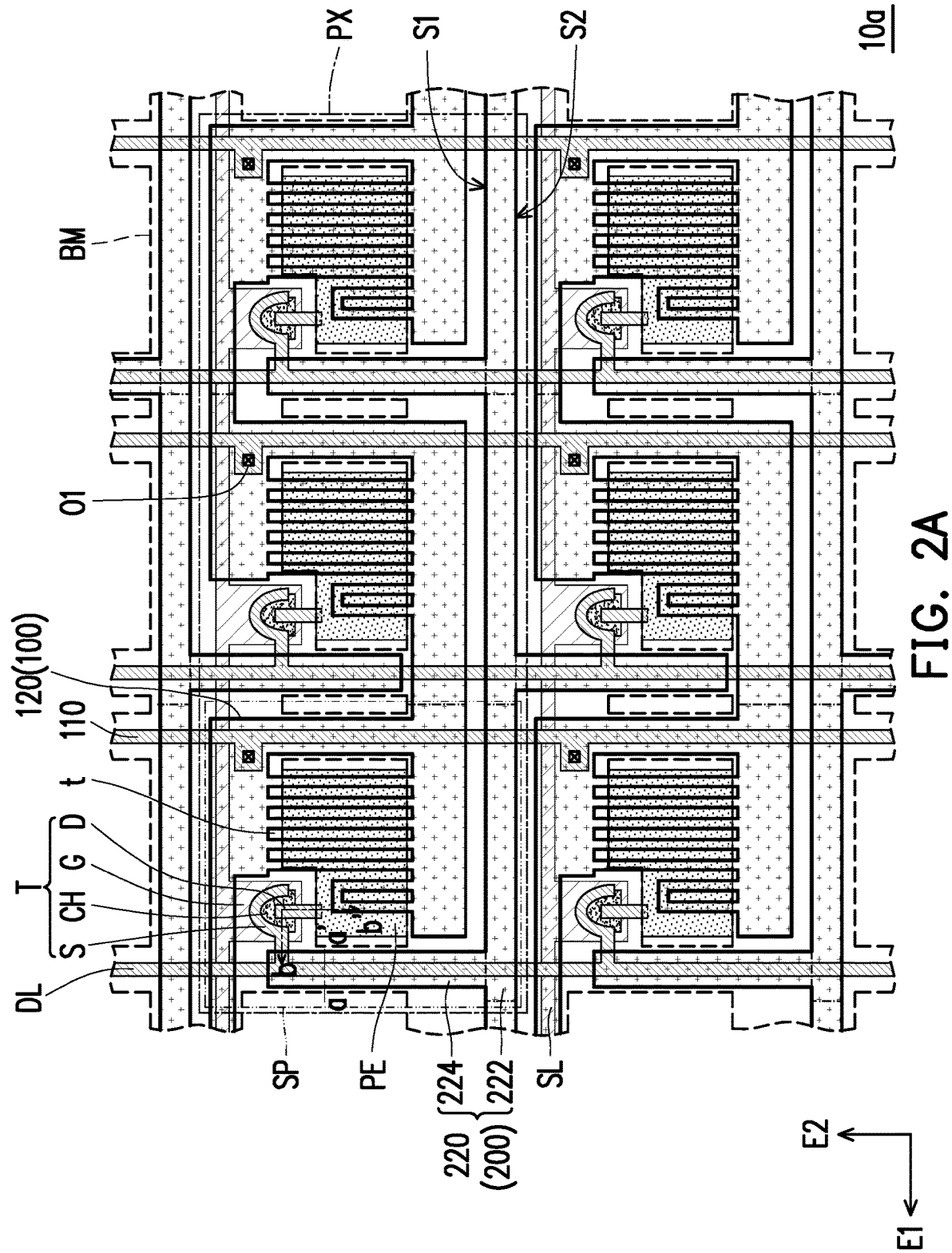
FIG. 2A is a schematic top view of a touch panel according to an embodiment of the disclosure.
Figure 2B:
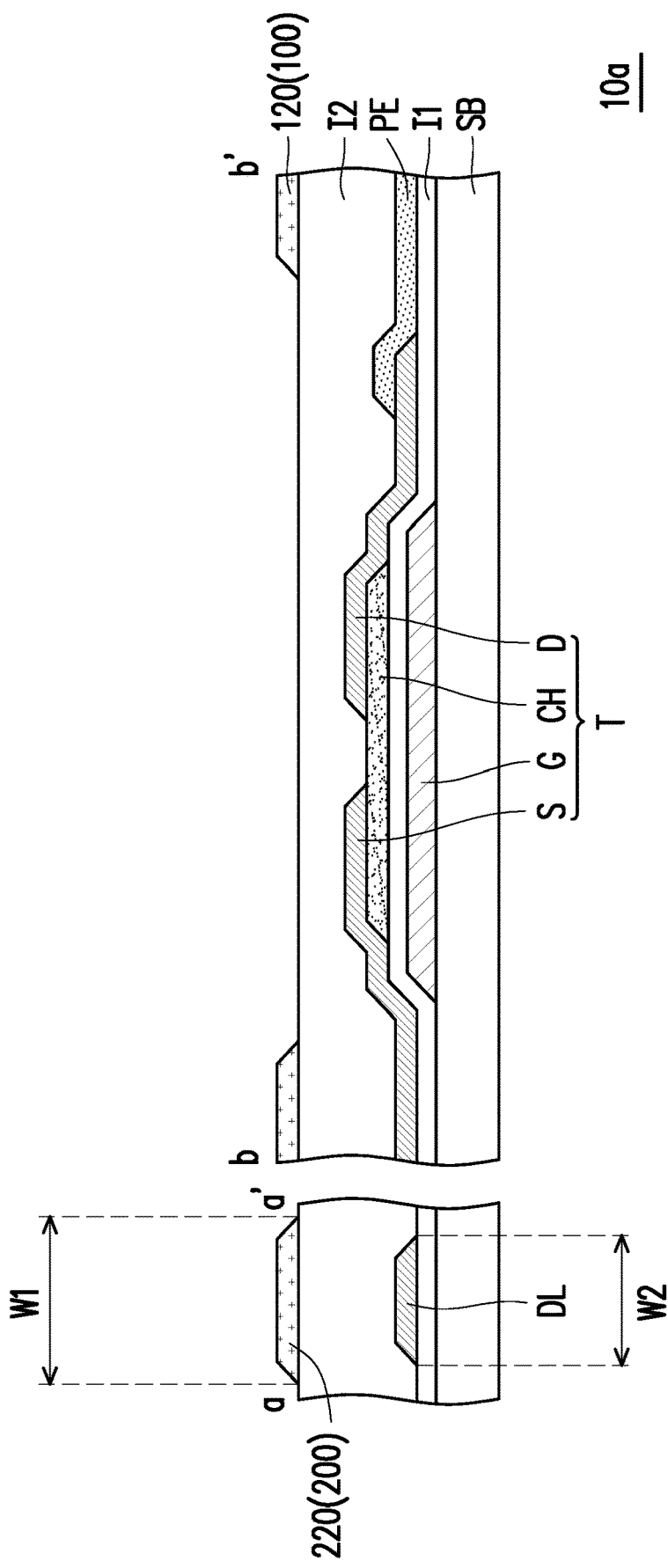
FIG. 2B is a schematic cross-sectional view taken along the line a-a' and the line b-b' in FIG. 2A.

FIG. 2A is a schematic top view of a touch panel according to an embodiment of the disclosure, and FIG. 2A is a partial enlarged view of a display region of the touch panel. FIG. 2B is a schematic cross-sectional view taken along the line a-a' and the line b-b' in FIG. 2A. Here, note that the reference numbers and some descriptions of the embodiment depicted in FIG. 2A and FIG. 2B follow those of the embodiment depicted in FIG. 1, the same or similar reference numbers serve to indicate the same or similar elements, and the same technical descriptions are omitted. Reference may be made to the previous embodiment for the omitted descriptions, and thus no redundant descriptions will be provided hereinafter.

With reference to FIG. 2A and FIG. 2B, a touch panel 10a includes a substrate SB (not shown in FIG. 2A), a plurality of touch signal lines 110, a plurality of sub-pixels SP, a plurality of touch electrode groups 100, and at least one common signal array 200. The touch signal lines 110, the sub-pixels SP, the touch electrode groups 100, and the at least one common signal array 200 are located on the substrate SB. In some embodiments, the touch panel 10a further includes a black matrix BM (not shown in FIG. 2B), which is disposed on a color filter substrate (not shown in FIG. 2B) or the substrate SB, for instance.

Each of the sub-pixels SP includes a switch element T and a pixel electrode PE. The switch element T includes a gate a channel layer CH, a source S, and a drain D. The switch element T is electrically connected to a corresponding scan line SL and a corresponding data line DL. The black matrix BM overlaps the switch elements T, the scan lines SL, the data lines DL, and the touch signal lines 110.

In the embodiment, the gate G of the switch element T and the scan line SL are located on the substrate SB, and the gate G is electrically connected to the corresponding scan line SL. The scan line SL extends along a first direction E1.

In the embodiment, the gate G and the scan line SL belong to a first conductive layer. For instance, a method for forming the gate G and the scan line SL includes forming a conductive material on the substrate SB and then patterning the conductive material to form the first conductive layer including the gate G and the scan line SL. In some embodiments, a material of the first conductive layer includes chromium, gold, silver, copper, tin, lead, hafnium, tungsten, molybdenum, neodymium, titanium, tantalum, aluminum, zinc, alloys of the above metals, oxides of the above metals, nitrides of the above metals, combinations of the above materials, or other conductive materials, which should however not be construed as a limitation in the disclosure.

The channel layer CH is located on an insulation layer I1 and overlaps the gate G The insulation layer I1 is sandwiched between the channel layer CH and the gate G The channel layer CH includes, for instance, a doped or undoped semiconductor material.

In the embodiment, the source S, the drain D, the data line DL, and the touch signal line 110 are located on the insulation layer I1. The source S and the drain D are electrically connected to the channel layer CH. The source S is electrically connected to the corresponding data line DL. The drain D of the switch element T is electrically connected to the pixel electrode PE. The data line DL and the touch signal line 110 extend along a second direction E2, and the first direction E1 and the second direction E2 are staggered.

In the embodiment, the source S, the drain D, the data line DL, and the touch signal line 110 belong to a second conductive layer. For instance, a method for forming the source S, the drain D, the data line DL, and the touch signal line 110 includes forming a conductive material on the substrate SB and then patterning the conductive material to form the second conductive layer including the source S, the drain D, the data line DL, and the touch signal line 110. In some embodiments, a material of the second conductive layer includes chromium, gold, silver, copper, tin, lead, hafnium, tungsten, molybdenum, neodymium, titanium, tantalum, aluminum, zinc, alloys of the above metals, oxides of the above metals, nitrides of the above metals, combinations of the above materials, or other conductive materials, which should however not be construed as a limitation in the disclosure.

In the embodiment, before the second conductive layer is formed, the channel layer CH is formed on the insulation layer I1, which should however not be construed as a limitation in the disclosure.

The pixel electrode PE is located on the insulation layer I1 and partially overlaps the drain D. A material of the pixel electrode PE includes, for instance, a transparent conductive material, e.g., indium tin oxide (ITO), indium zinc oxide (IZO), aluminum tin oxide (ATO), aluminum zinc oxide (AZO), indium gallium zinc oxide (IGZO), or a stacked layer of at least two of the above materials.

In some embodiments, the switch element T is a back-channel etch-type thin film transistor (TFT), and an ohmic contact layer may be selectively included between the source S and the channel layer CH and between the drain D and the channel layer CH, which should however not be construed as a limitation in the disclosure. In other embodiments, the switch element T is a top-gate type TFT or another TFT of another type.

A dielectric layer I2 is located on the switch element T. The touch electrode 120 and the common electrode 220 are located on the dielectric layer I2. The touch electrode 120 and the common electrode 220 are structurally separated from each other, thereby reducing resistor-capacitor loading (RC loading) on the touch electrode 120. A material of the common electrode 220 and the touch electrode 120 includes a transparent conductive material, e.g., ITO, IZO, ATO, AZO, IGZO, or a stacked layer of at least two of the above materials. In the embodiment, the common electrode 220 and the touch electrode 120 belong to the same conductive layer. For instance, a method of forming the common electrode 220 and the touch electrode 120 includes first forming a transparent conductive layer on the dielectric layer I2 and then patterning the transparent conductive layer to form the common electrode 220 and the touch electrode 120.

In the embodiment, the touch electrode 120 and the common electrode 220 do not overlap the channel layer of the switch element T, thereby preventing the touch electrode 120 and the common electrode 220 from affecting the operation of the switch element T.

The touch electrode groups 100 include a plurality of touch electrodes 120 which are electrically connected to each other. Each of the touch electrodes 120 overlaps the pixel electrode PE of one of the sub-pixels SP. The touch electrode groups 100 are electrically connected to at least one corresponding touch signal line 110. In the embodiment, the touch electrode groups 100 are electrically connected to a plurality of touch signal lines 110. In the embodiment, the touch electrodes 120 are electrically connected to the touch signal lines 110 through an opening O1, and the opening O1 penetrates the dielectric layer I2.

In the embodiment, the common signal array 200 includes a plurality of common electrodes 220 which are electrically connected to each other. For instance, the common electrodes 220 are directly connected to each other in the peripheral region or electrically connected to each other through other conductive wires. In the embodiment, the number of sub-pixels SP overlapped by the common signal array 200 is greater than the number of sub-pixels SP overlapped by each of the touch electrode groups 100.

Each of the common electrodes 220 overlaps at least one of the scan line SL and the data line DL. In the embodiment, the common electrode 220 overlaps the data line DL, thereby reducing the parasitic capacitance between the data line DL and the touch electrode 120. In some embodiments, a width W1 of a region where the common electrode 220 overlaps the data line DL is greater than a width W2 of the data line DL. In the embodiment, in one sub-pixel SP, the common electrode 220 does not completely cover the data line DL, which should however not be construed as a limitation in the disclosure. In other embodiments, in one sub-pixel SP, the common electrode 220 may completely cover the data line DL. In some embodiments, in one sub-pixel SP, an area of the region where the data line DL overlaps the common electrode 220 accounts for 14%-100% of an area of the data line DL.

In the embodiment, each of the common electrodes 220 includes a first portion 222 and a second portion 224 perpendicular to the first portion 222. For instance, the first portion 222 extends along the first direction E1, and the second portion 224 extends along the second direction E2. The second portion 224 overlaps the data line DL. The second portions 224 of parts of the common electrodes 220 are located on a first side S1 of the first portions 222, and the second portions 224 of the other parts of the common electrodes 220 are located on a second side of the first portions 222. The second side S2 is opposite to the first side S1. In the embodiment, in the first direction E1, the adjacent common electrodes 220 are directly connected. In the embodiment, in the first direction E1, the second portions 224 of the common electrodes 220 are alternately disposed on the first side S1 and the second side S2 of the first portions 222.

In the embodiment, in one touch electrode group 100, the adjacent touch electrodes 120 in the first direction E1 are directly connected, and the touch electrodes 120 are separated from each other in the second direction E2. For instance, in the second direction E2, the common electrode 220 is located between two touch electrodes 120 to separate the two touch electrodes 120 from each other. The touch electrodes 120 in the second direction E2 are electrically connected by the touch signal lines 110. In the embodiment, the adjacent touch electrode groups 100 are separated from each other. In other words, the touch electrodes 120 of the adjacent touch electrode group 100 in the first direction E1 are separated from each other, and the touch electrodes 120 of the adjacent touch electrode group 100 in the second direction E2 are separated from each other.

In the embodiment, the pixel electrodes PE are located between the touch electrode 120 and the substrate SB, each touch electrode 120 includes a plurality of slits t, and the slits t overlap the pixel electrodes PE, which should however not be construed as a limitation in the disclosure. In other embodiments, the touch electrodes 120 are located between the pixel electrodes PE and the substrate SB, each pixel electrode PE includes a plurality of slits, and the slits overlap the touch electrodes 120.

Figure 3:
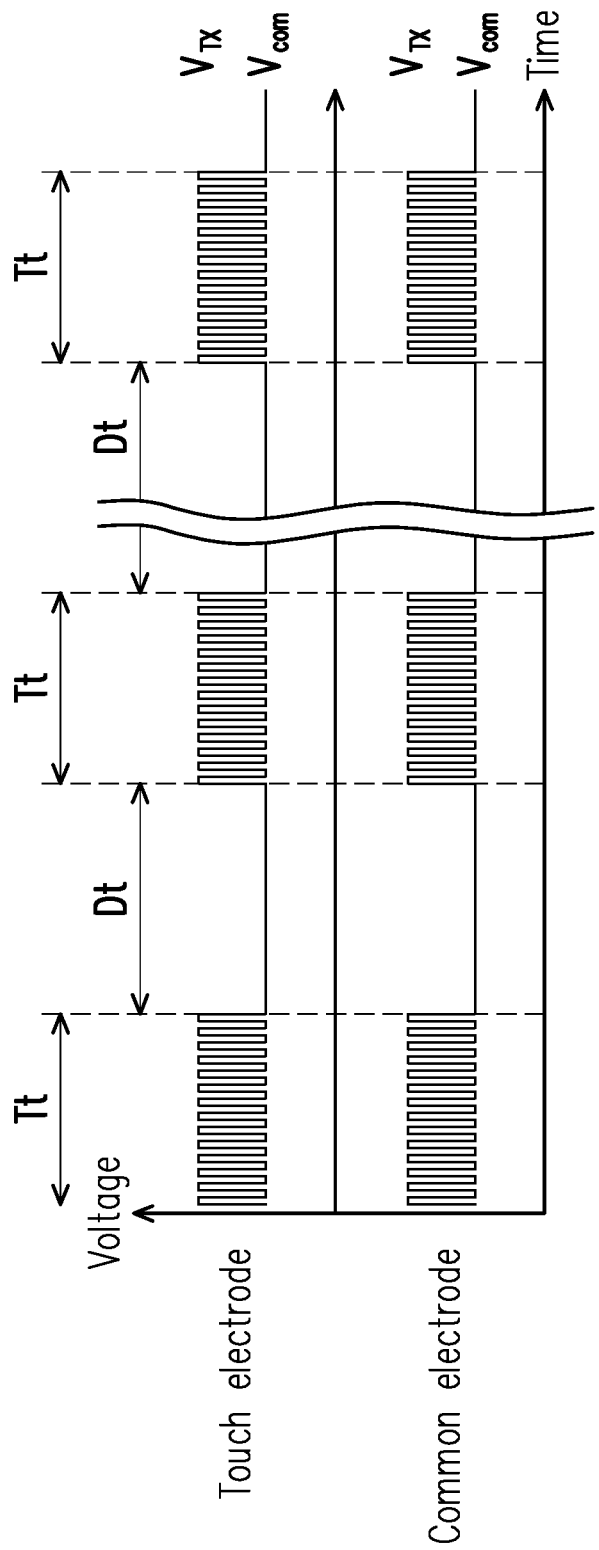
FIG. 3 is a signal waveform diagram of a touch panel according to an embodiment of the disclosure.

FIG. 3 is a signal waveform diagram of a touch panel according to an embodiment of the disclosure.

With reference to FIG. 2A and FIG. 3, a touch panel 10a is being operated in a display time slot Dt and a touch time slot Tt. In the display time slot Dt, by applying a common voltage $V_{com}$ to the touch electrodes 120 and the common electrodes 220, an electric field is generated between the pixel electrodes PE and the touch electrodes 120 and between the pixel electrodes PE and the common electrodes 220 to control the orientation of liquid crystal, so as to obtain the to-be-displayed image. In the touch time slot Tt, a touch voltage $V_{TX}$ is applied to the touch electrodes 120. When an object (e.g., a finger or a stylus) approaches the corresponding touch electrode 120, the touch location may be detected by the change to the capacitance on the corresponding touch electrode 120. In the embodiment, during the touch time slot Tt, the touch voltage $V_{TX}$ is applied to both the common electrodes 220 and the touch electrodes 120, which should however not be construed as a limitation in the disclosure. In some embodiments, the common voltage $V_{com}$ is applied to the common electrodes 220 no matter whether the touch panel 10a is being operated in the display time slot Dt or the touch time slot Tt.

Figure 4A:
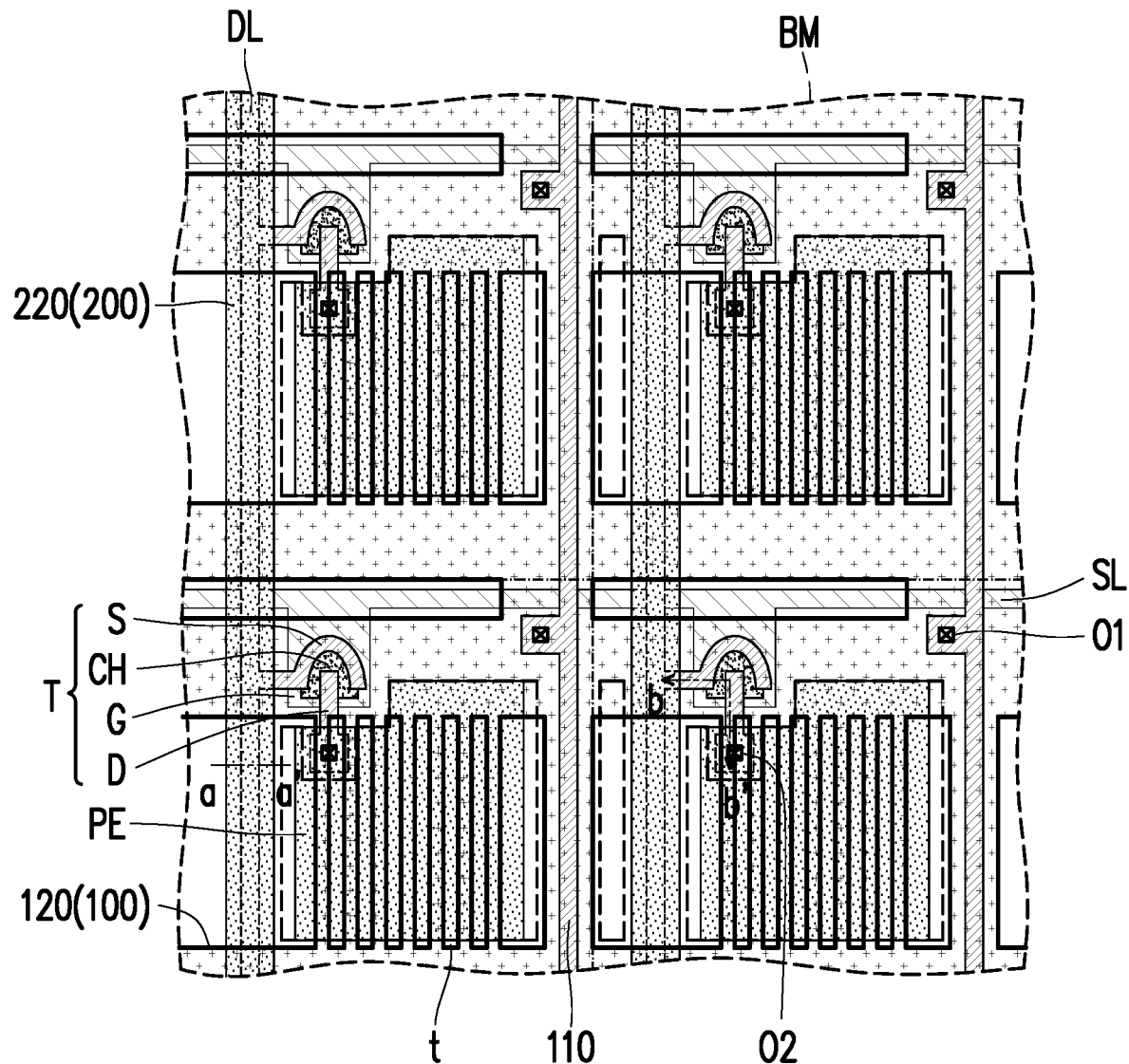
FIG. 4A is a schematic top view of a touch panel according to an embodiment of the disclosure.
Figure 4B:
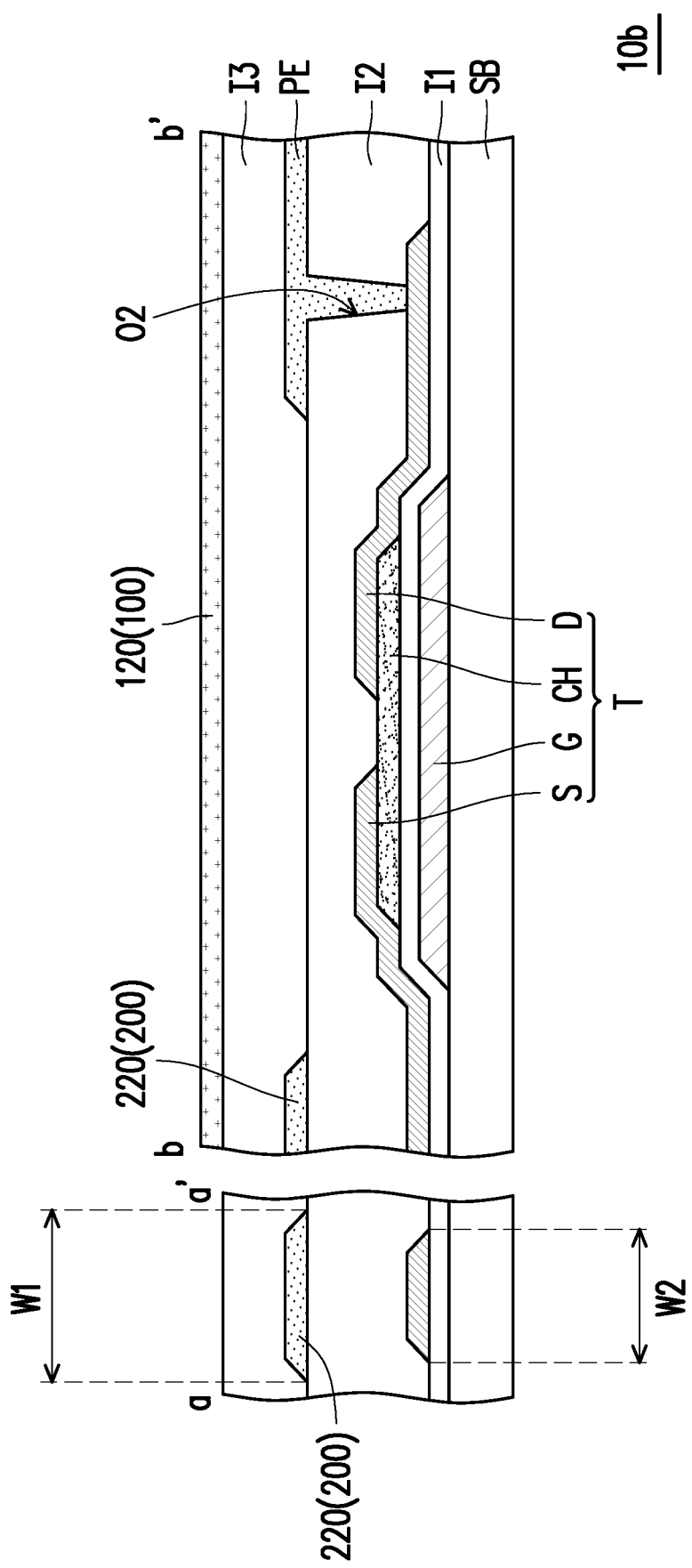
FIG. 4B is a schematic cross-sectional view taken along the line a-a' and the line b-b' in FIG. 4A.

FIG. 4A is a schematic top view of a touch panel according to an embodiment of the disclosure. FIG. 4B is a schematic cross-sectional view taken along the line a-a' and the line b-b' in FIG. 4A. Here, note that the reference numbers and some descriptions of the embodiment depicted in FIG. 4A and FIG. 4B follow those of the embodiment depicted in FIG. 2A and FIG. 2B, the same or similar reference numbers serve to indicate the same or similar elements, and the same technical descriptions are omitted. Reference may be made to the previous embodiment for the omitted descriptions, and thus no redundant descriptions will be provided hereinafter.

The main difference between a touch panel 10b in FIG. 4A and the touch panel 10a in FIG. 2A lies in that the touch electrodes 120 and the common electrodes 220 of the touch panel 10b belong to different conductive film layers.

With reference to FIG. 4A and FIG. 4B, the pixel electrodes PE are formed on the dielectric layer I2, and each pixel electrode PE is electrically connected to the drain D of the switch element T through an opening O2. Here, the opening O2 penetrates the dielectric layer I2.

The common electrodes 220 are formed on the dielectric layer I2, and the common electrodes 220 extend along the second direction E2. Each of the common electrodes 220 overlaps the data line DL. In other embodiments, parts of the common electrode 220 extend along the first direction E1 and overlap the scan line SL, and the other parts of the common electrode 220 extend along the second direction E2 and overlap the data line DL, thereby further reducing parasitic capacitance on the touch electrode 120. In the embodiment, the common electrodes 220 and the pixel electrodes PE belong to the same conductive layer. For instance, a transparent conductive material layer is formed on the dielectric layer I2, and the transparent conductive material layer is patterned to form the common electrodes 220 and the pixel electrodes PE.

In the embodiment, the touch panel 10b further includes a dielectric layer I3. The dielectric layer I3 is formed on the dielectric layer I2. The touch electrodes 120 are formed on the dielectric layer I3 and are electrically connected to the touch signal lines 110 through the openings O1, wherein the openings O1 penetrate the dielectric layer I2 and the dielectric layer I3.

In the embodiment, in the first direction E1, the adjacent touch electrodes 120 are directly connected, and in the second direction E2, the adjacent touch electrodes 120 are directly connected.

In the embodiment, the touch electrodes 120 overlap the switch elements T. The touch panel 10b includes, for instance, a dielectric layer adapted to an ultra-high aperture (UHA) technology. The dielectric layer can increase a distance between the touch electrodes 120 and the switch elements T. Therefore, even though the touch electrodes 120 overlap the switch elements T, the touch electrodes 120 do not pose any significant impact on the switch elements T.

In view of the above, each of the common electrodes 220 of the touch panel 10b overlaps the data line DL, thereby reducing the parasitic capacitance between the data lines DL and the touch electrodes 120.

Figure 5:
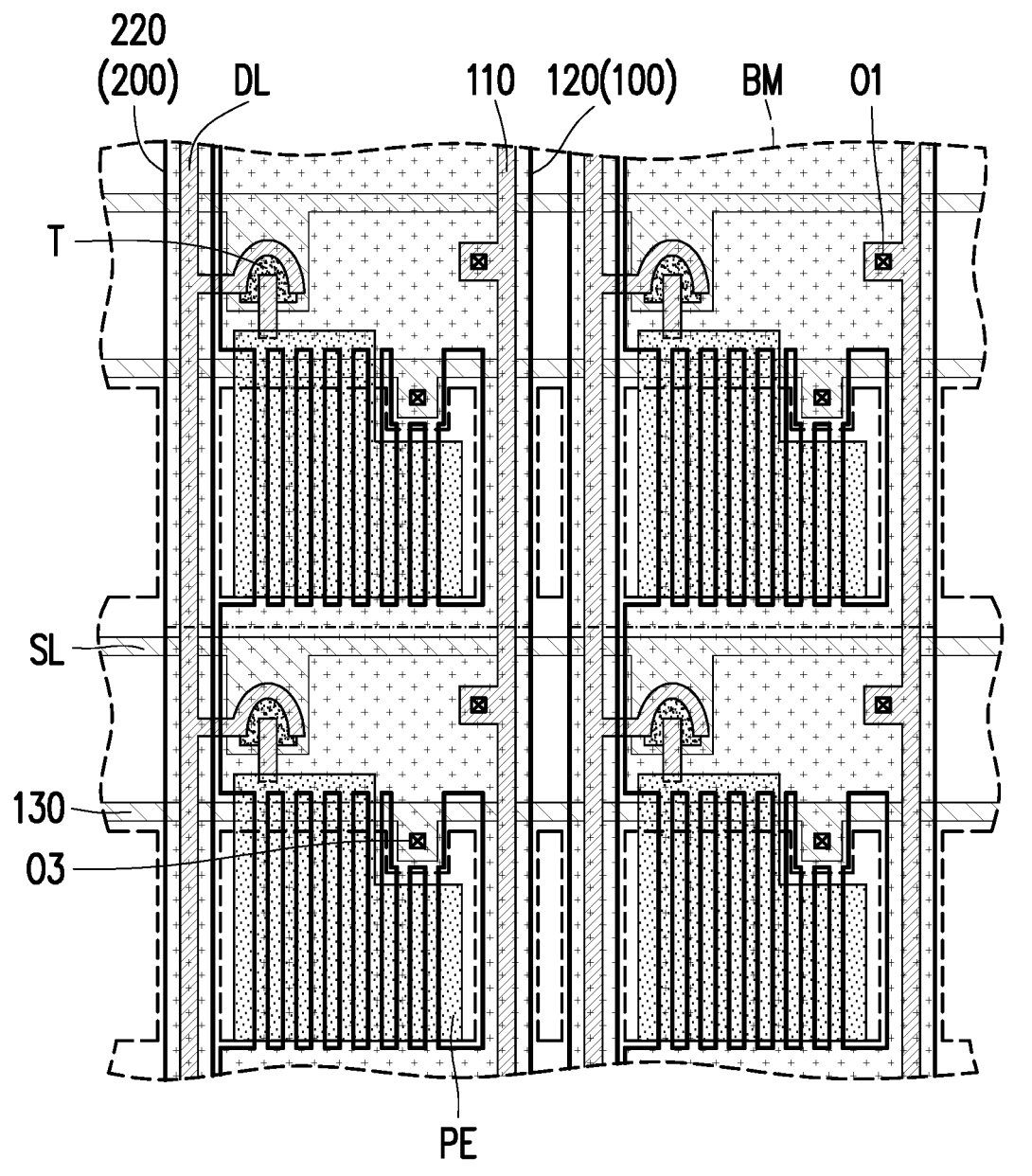
FIG. 5 is a schematic top view of a touch panel according to an embodiment of the disclosure.

FIG. 5 is a schematic top view of a touch panel according to an embodiment of the disclosure. Here, note that the reference numbers and some descriptions of the embodiment depicted in FIG. 5 follow those of the embodiment depicted in FIG. 2A and FIG. 2B, the same or similar reference numbers serve to indicate the same or similar elements, and the same technical descriptions are omitted. Reference may be made to the previous embodiment for the omitted descriptions, and thus no redundant descriptions will be provided hereinafter.

The main difference between a touch panel 10c in FIG. 5 and the touch panel 10a in FIG. 2A lies in that in one touch electrode group 100 of the touch panel 10c, the adjacent touch electrodes 120 are separated from each other in the first direction E1.

In the embodiment, the touch electrodes 120 and the common electrodes 220 belong to the same conductive layer. In the second direction E2, the adjacent touch electrodes 120 are directly connected, and in the second direction E2, the adjacent common electrodes 220 are directly connected.

In the embodiment, in the first direction E1, each common electrode 220 is located between two touch electrodes 120, so that the two touch electrodes 120 are separated from each other. Extension directions of bridge conductive wires 130 (e.g., the first direction E1) and extension directions of the common electrodes 220 (e.g., the second direction E2) are staggered, and the bridge conductive wires 130 are electrically connected to the touch electrodes 120, so that the touch electrodes 120 in the first direction E1 are electrically connected to via the bridge conductive wires 130.

In some embodiments, the bridge conductive wires 130 and the scan lines SL belong to the same conductive layer, and each touch electrode 120 is electrically connected to one of the bridge conductive wires 130 through an opening O3. Here, the opening O3 penetrates the dielectric layer and the insulation layer (e.g., the dielectric layer I2 and the insulation layer I1 in FIG. 2A).

In view of above, each of the common electrodes 220 of the touch panel 10c overlaps the data line DL, thereby reducing the parasitic capacitance between the data lines DL and the touch electrodes 120.

Figure 6A:
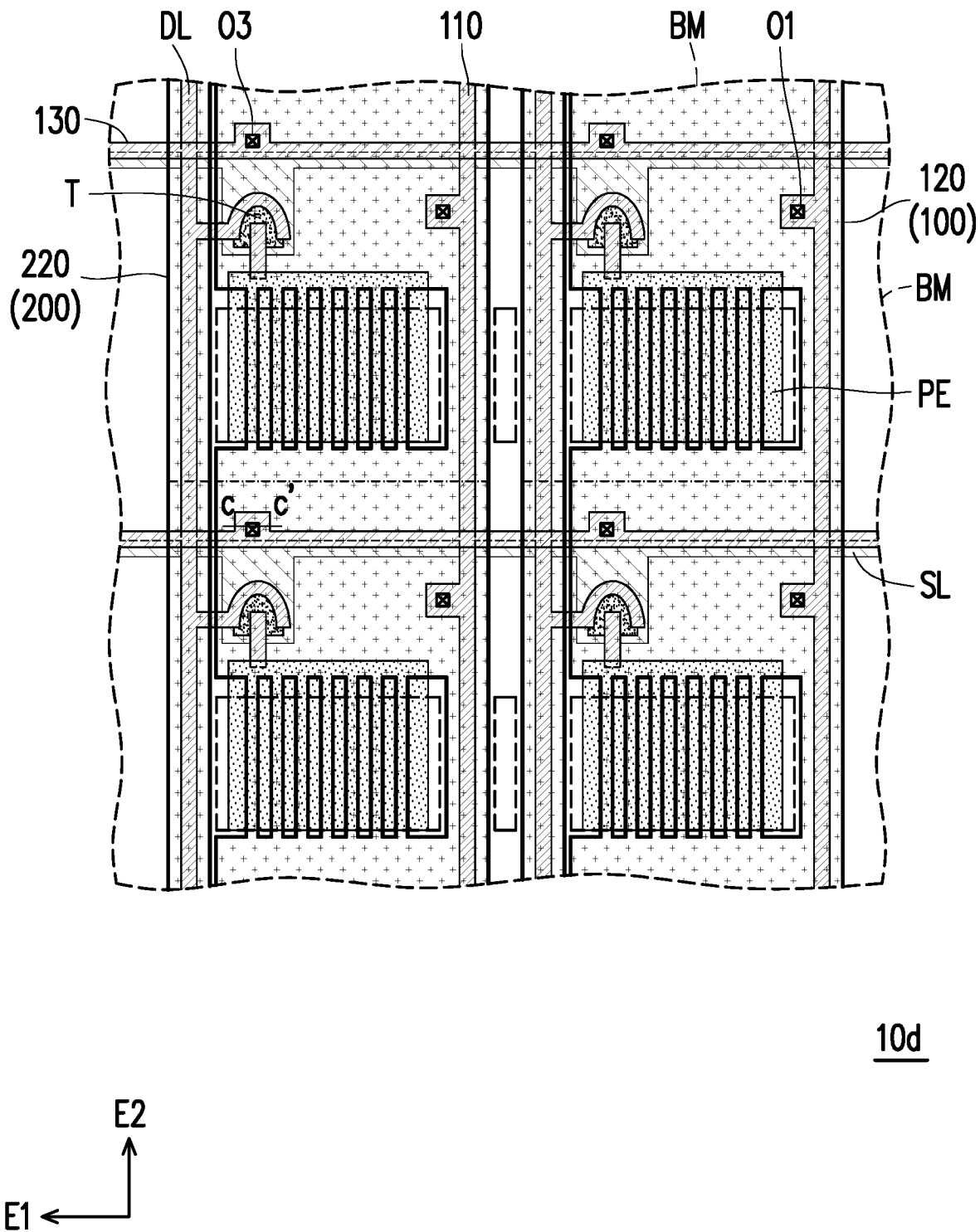
FIG. 6A is a schematic top view of a touch panel according to an embodiment of the disclosure.
Figure 6B:
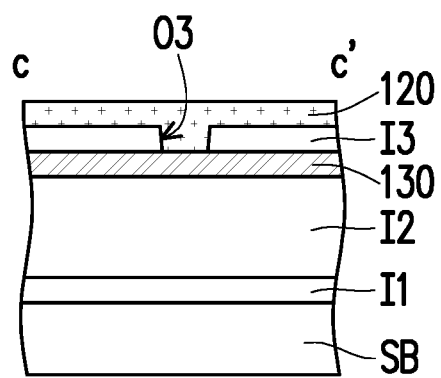
FIG. 6B is a schematic cross-sectional view along the line c-c' in FIG. 6A.

FIG. 6A is a schematic top view of a touch panel according to an embodiment of the disclosure. FIG. 6B is a schematic cross-sectional view along the line c-c' in FIG. 6A. Here, note that the reference numbers and some descriptions of the embodiment depicted in FIG. 6A and FIG. 6B follow those of the embodiment depicted in FIG. 5, the same or similar reference numbers serve to indicate the same or similar elements, and the same technical descriptions are omitted. Reference may be made to the previous embodiment for the omitted descriptions, and thus no redundant descriptions will be provided hereinafter.

The main difference between a touch panel 10d in FIG. 6A and the touch panel 10c in FIG. 5 lies in that the bridge conductive wires 130 and the scan lines SL of the touch panel 10d belong to different conductive layers.

With reference to FIG. 6A and FIG. 6B, in the embodiment, the bridge conductive wires 130 are located on the dielectric layer I2. The dielectric layer I3 is located on the dielectric layer I2. The touch electrodes 120 and the common electrodes 220 are located on the dielectric layer I3. The touch electrodes 120 are electrically connected to the bridge conductive wires 130 through the opening O3, and the opening O3 penetrates the dielectric layer I3.

In view of the above, the common electrodes 220 of the touch panel 10d overlap the data lines DL, thereby reducing the parasitic capacitance between the data lines DL and the touch electrodes 120.

Figure 7A:
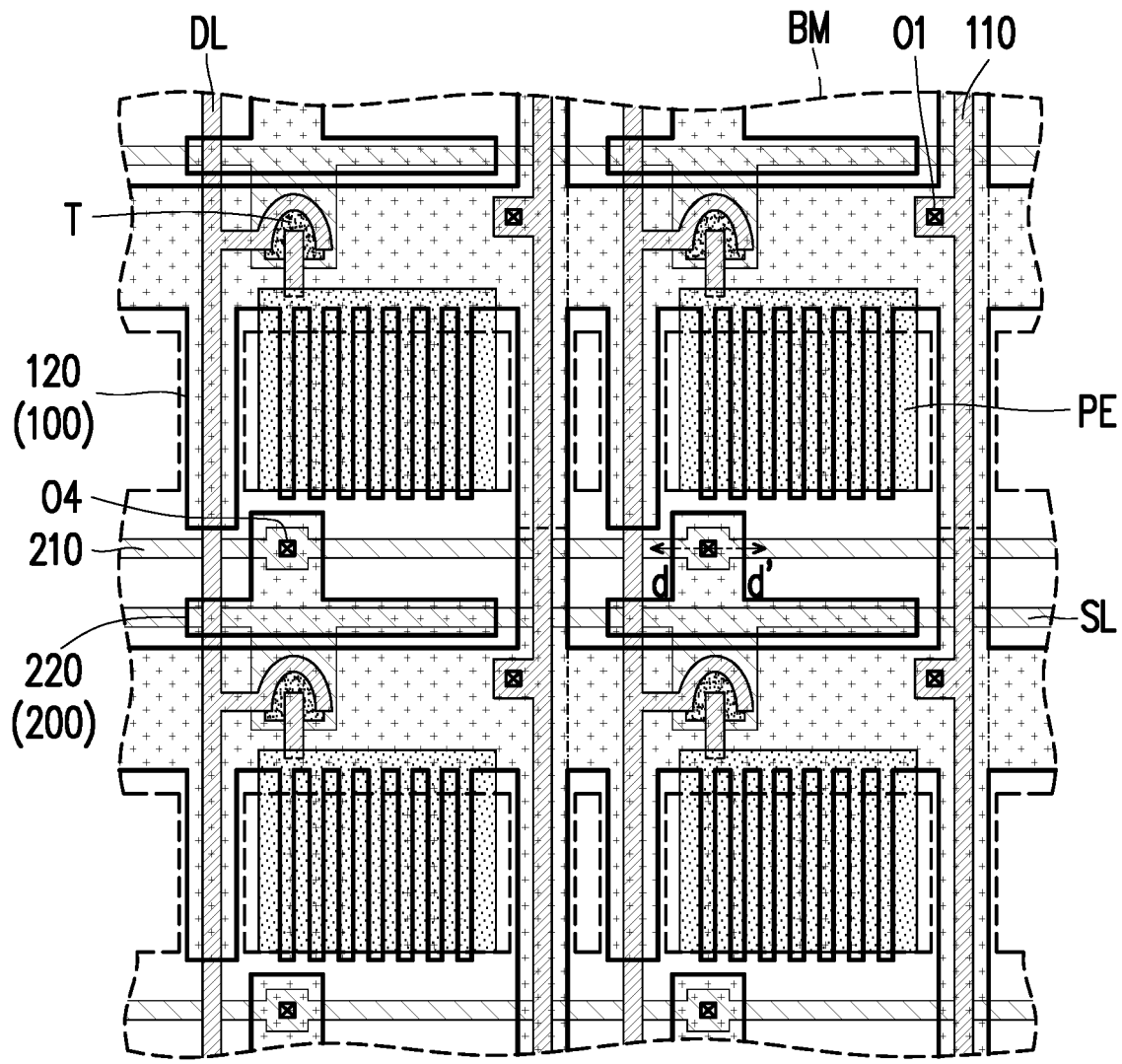
FIG. 7A is a schematic top view of a touch panel according to an embodiment of the disclosure.
Figure 7B:
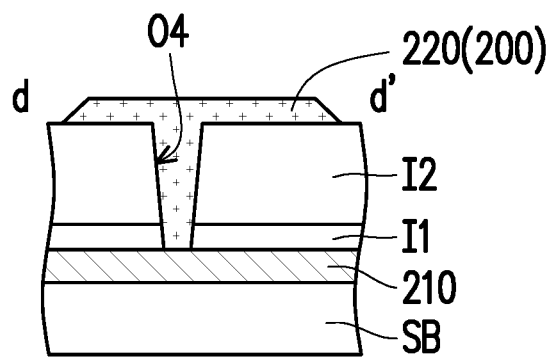
FIG. 7B is a schematic cross-sectional view taken along the line d-d' in FIG. 7A.

FIG. 7A is a schematic top view of a touch panel according to an embodiment of the disclosure. FIG. 7B is a schematic cross-sectional view taken along the line d-d' in FIG. 7A. Here, note that the reference numbers and some descriptions of the embodiment depicted in FIG. 7A and FIG. 7B follow those of the embodiment depicted in FIG. 2A and FIG. 2B, the same or similar reference numbers serve to indicate the same or similar elements, and the same technical descriptions are omitted. Reference may be made to the previous embodiment for the omitted descriptions, and thus no redundant descriptions will be provided hereinafter.

The main difference between a touch panel 10e in FIG. 7A and the touch panel 10a in FIG. 2A lies in that the touch panel 10e further includes a plurality of first common signal lines 210.

With reference to FIG. 7A and FIG. 7B, the touch panel 10e includes a substrate, a plurality of touch signal lines 110, a plurality of sub-pixels, a plurality of touch electrode groups 100, and at least one common signal array 200. The touch signal lines 110, the touch electrode groups 100, the common signal array 200, and the sub-pixels are located on the substrate.

Each of the sub-pixels includes the switch element T and the pixel electrode PE. The switch element T is electrically connected to a corresponding scan line SL and a corresponding data line DL. The pixel electrode PE is electrically connected to the switch element T.

Each of the touch electrode groups 100 includes a plurality of touch electrodes 120. The touch electrodes 120 overlap the pixel electrodes PE of the sub-pixels. Each of the touch electrode groups 100 is electrically connected to at least one corresponding touch signal line 110. In the embodiment, in one touch electrode group 100, the adjacent touch electrodes 120 in the first direction E1 are directly connected to each other, and the adjacent touch electrodes 120 in the second direction E2 are directly connected to each other. In the embodiment, the adjacent touch electrode groups 100 are separated from each other. In other words, the adjacent touch electrodes 120 of the touch electrode groups 100 in the first direction E1 are separated from each other, and the adjacent touch electrodes 120 of the touch electrode groups 100 in the second direction E2 are separated from each other.

The common signal array 200 includes a plurality of common electrodes 220, and the common electrodes 220 and the touch electrodes 120 belong to the same conductive layer. In the embodiment, each touch electrode 120 is located between the adjacent common electrodes 220, so that the common electrodes 220 are structurally separated from each other. In the embodiment, the common signal array 200 further includes a plurality of first common signal lines 210. The first common signal lines 210 extend along the first direction E1 and enable the adjacent common electrodes 220 in the first direction E1 to be electrically connected. The first common signal lines 210 are electrically connected to each other. For instance, the first common signal lines 210 in the peripheral region are electrically connected to each other by other conductive wires. The number of the sub-pixels SP overlapped by the common signal array 200 is greater than the number of the sub-pixels SP overlapped by each of the touch electrode groups 100.

In the embodiment, the first common signal lines 210 and the scan lines SL belong to the same conductive layer, and the common electrodes 220 are electrically connected to the first common signal lines 210 through openings O4. Here, the openings O4 penetrate the dielectric layer I2 and the insulation layer I1, for instance.

In the embodiment, the common electrodes 220 overlap the scan lines SL, thereby reducing the parasitic capacitance between the touch electrodes 120 and the scan lines SL.

Figure 8:
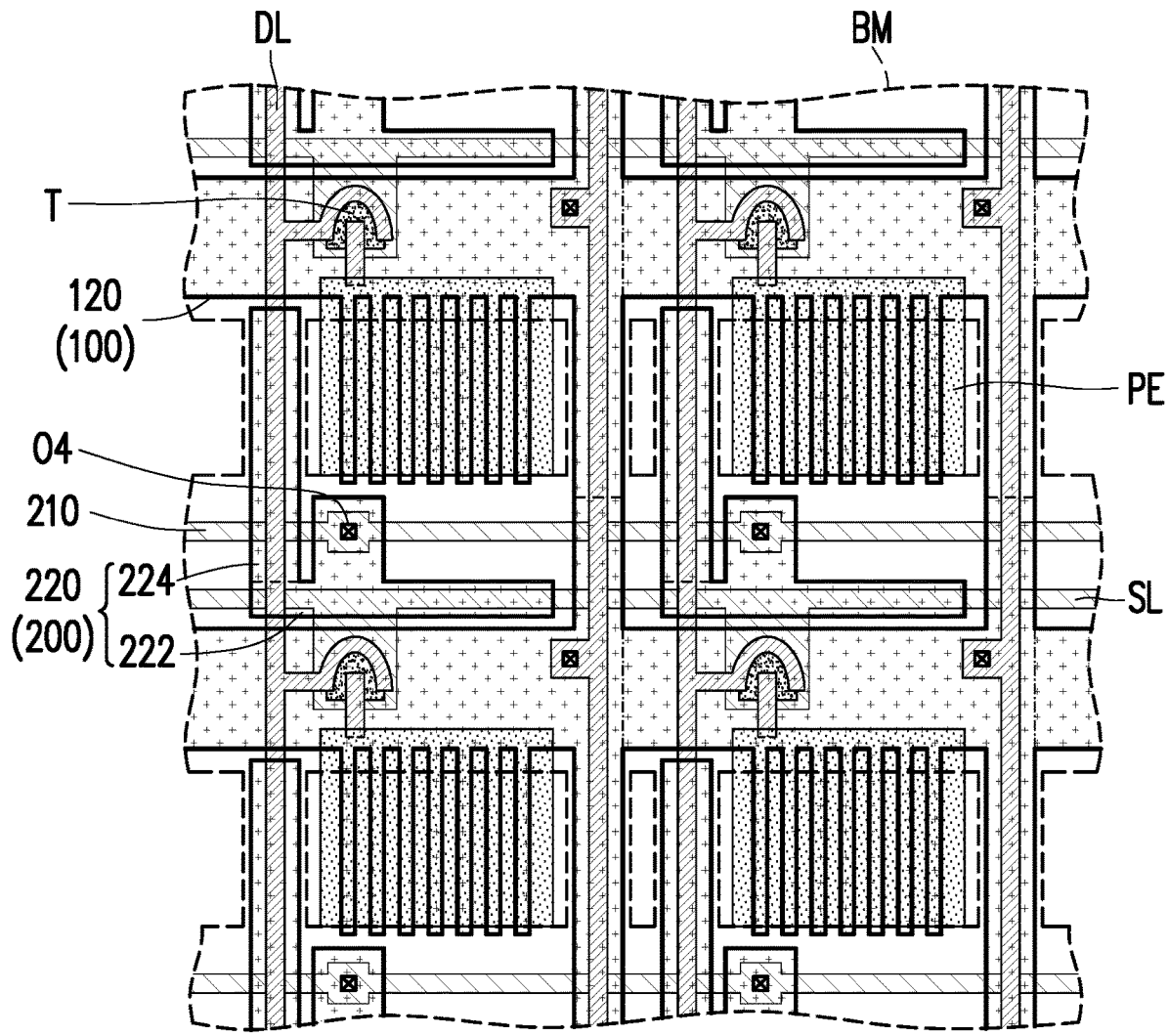
FIG. 8 is a schematic top view of a touch panel according to an embodiment of the disclosure.

FIG. 8 is a schematic top view of a touch panel according to an embodiment of the disclosure. Here, note that the reference numbers and some descriptions of the embodiment depicted in FIG. 8 follow those of the embodiment depicted in FIG. 7A and FIG. 7B, the same or similar reference numbers serve to indicate the same or similar elements, and the same technical descriptions are omitted. Reference may be made to the previous embodiment for the omitted descriptions, and thus no redundant descriptions will be provided hereinafter.

The main difference between a touch panel 10f in FIG. 8 and the touch panel 10e in FIG. 7A lies in that the common electrodes 220 of the touch panel 10f overlap the scan lines SL and the data lines DL.

With reference to FIG. 8, each common electrode 220 includes a first portion 222 and a second portion 224 perpendicular to the first portion 222. For instance, the first portions 222 extend along the first direction E1, and the second portions 224 extend along the second direction E2. The first portions 222 overlap the scan lines SL, and the second portions 224 overlap the data lines DL.

In view of the above, the common electrodes 220 of the touch panel 10f overlap the scan lines SL and the data lines DL, thereby reducing the parasitic capacitance between the scan lines SL and the touch electrodes 120 and the parasitic capacitance between the data lines DL and the touch electrodes 120.

Figure 9:
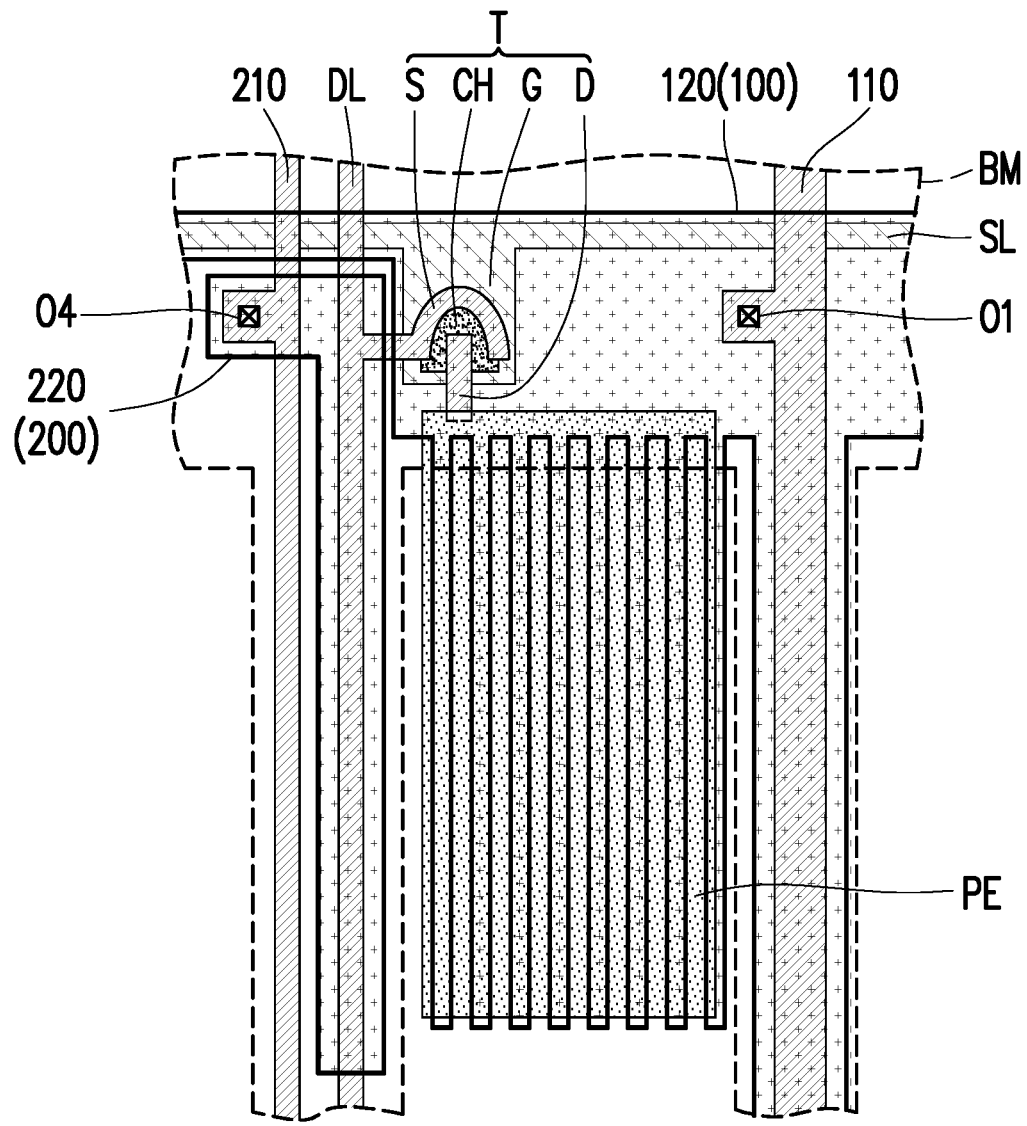
FIG. 9 is a schematic top view of a touch panel according to an embodiment of the disclosure.

FIG. 9 is a schematic top view of a touch panel according to an embodiment of the disclosure. Here, note that the reference numbers and some descriptions of the embodiment depicted in FIG. 9 follow those of the embodiment depicted in FIG. 8, the same or similar reference numbers serve to indicate the same or similar elements, and the same technical descriptions are omitted. Reference may be made to the previous embodiment for the omitted descriptions, and thus no redundant descriptions will be provided hereinafter.

The main difference between a touch panel 10g in FIG. 9 and the touch panel 10f in FIG. 8 lies in that the first common signal lines 210, the data lines DL, and the touch signal lines 110 of the touch panel 10g belong to the same conductive layer.

With reference to FIG. 9, the first common signal lines 210 extend along the second direction E2, and the common electrodes 220 are electrically connected to the first common signal lines 210 through the openings O4. Here, the openings O4 penetrate the dielectric layer (e.g., the dielectric layer I2 in FIG. 7B).

The first common signal lines 210 are electrically connected to each other. For instance, the first common signal lines 210 in the peripheral region are electrically connected to each other by other conductive wires. The number of the sub-pixels SP overlapped by the common signal array 200 is greater than the number of the sub-pixels SP overlapped by each of the touch electrode groups 100.

In view of the above, the common electrodes 220 of the touch panel 10g overlap the data lines DL, thereby reducing the parasitic capacitance between the data lines DL and the touch electrodes 120.

Figure 10:
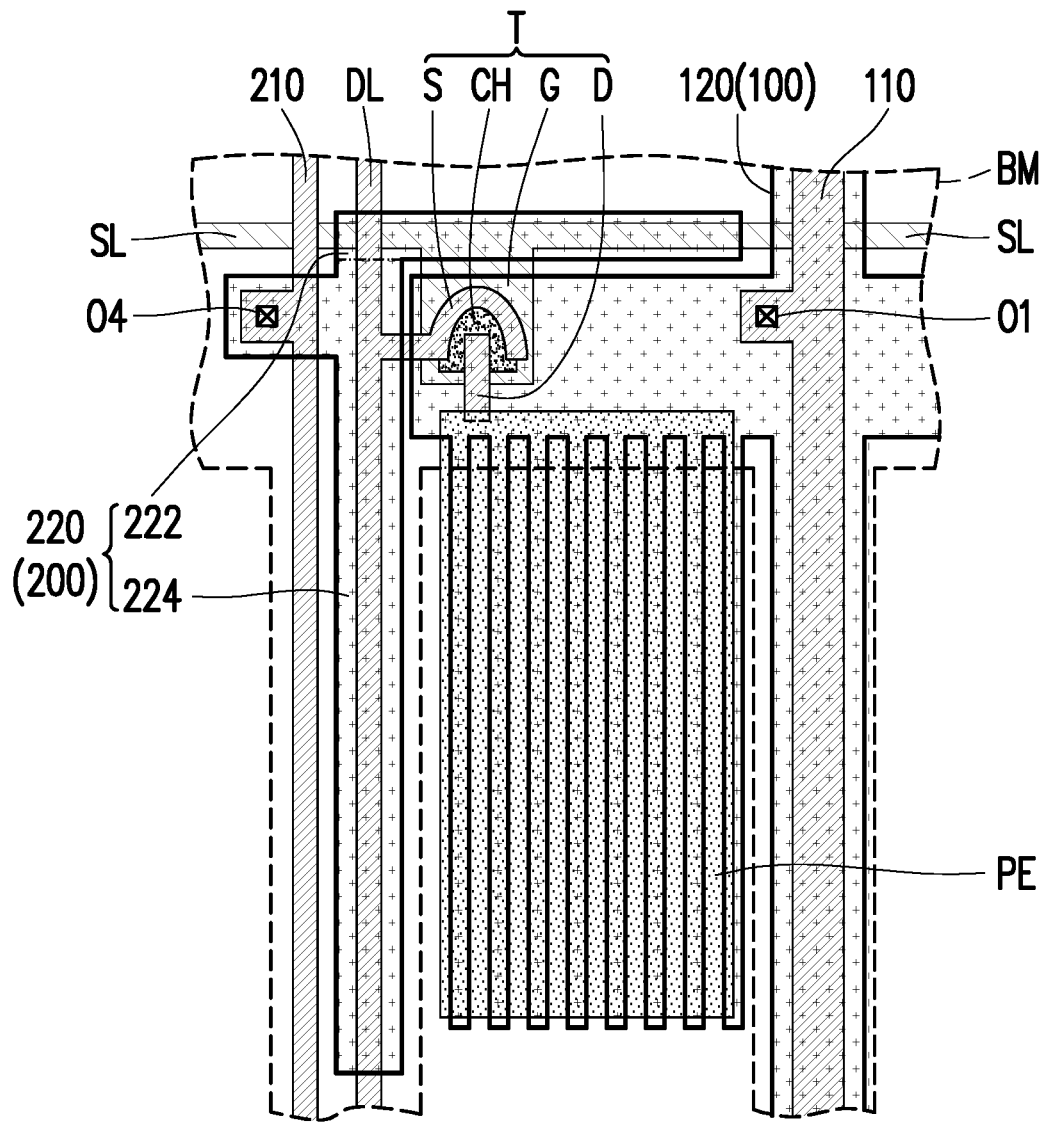
FIG. 10 is a schematic top view of a touch panel according to an embodiment of the disclosure.

FIG. 10 is a schematic top view of a touch panel according to an embodiment of the disclosure. Here, note that the reference numbers and some descriptions of the embodiment depicted in FIG. 10 follow those of the embodiment depicted in FIG. 9, the same or similar reference numbers serve to indicate the same or similar elements, and the same technical descriptions are omitted. Reference may be made to the previous embodiment for the omitted descriptions, and thus no redundant descriptions will be provided hereinafter.

The main difference between a touch panel 10h in FIG. 10 and the touch panel 10g in FIG. 9 lies in that the common electrodes 220 of the touch panel 10h overlap the data lines DL and the scan lines SL.

With reference to FIG. 10, each of the common electrodes 220 includes a first portion 222 and a second portion 224 perpendicular to the first portion 222. For instance, the first portions 222 extend along the first direction E1, and the second portions 224 extend along the second direction E2. The first portions 222 overlap the scan lines SL, and the second portions 224 overlap the data lines DL.

In view of the above, the common electrodes 220 of the touch panel 10h overlap the data lines DL and the scan lines SL, thereby reducing the parasitic capacitance between the scan lines SL and the touch electrodes 120 and the parasitic capacitance between the data lines DL and the touch electrodes 120.

Figure 11:
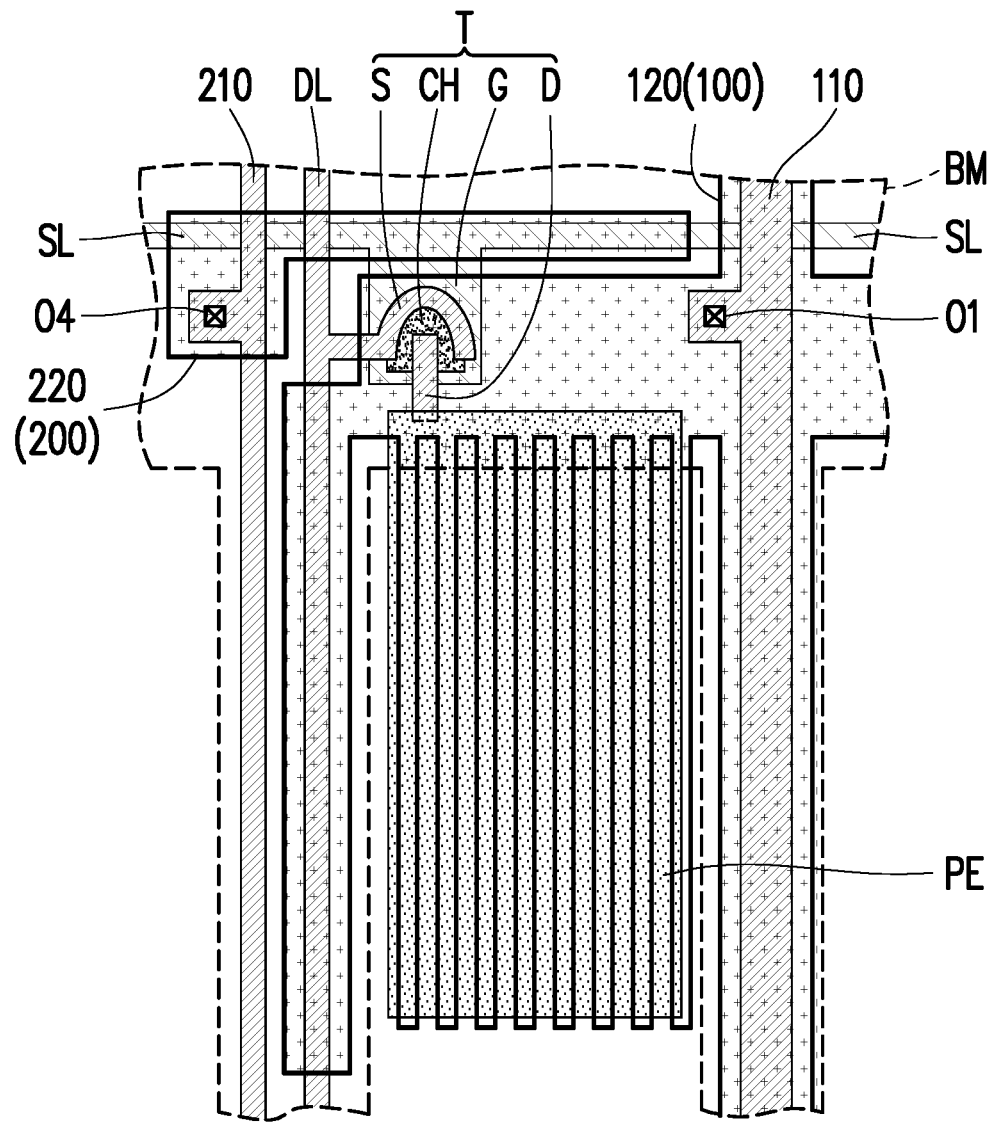
FIG. 11 is a schematic top view of a touch panel according to an embodiment of the disclosure.

FIG. 11 is a schematic top view of a touch panel according to an embodiment of the disclosure. Here, note that the reference numbers and some descriptions of the embodiment depicted in FIG. 11 follow those of the embodiment depicted in FIG. 9, the same or similar reference numbers serve to indicate the same or similar elements, and the same technical descriptions are omitted. Reference may be made to the previous embodiment for the omitted descriptions, and thus no redundant descriptions will be provided hereinafter.

The main difference between a touch panel 10i in FIG. 11 and the touch panel 10g in FIG. 9 lies in that the touch electrode 120s of the touch panel 10i overlap the data lines DL.

In the embodiment, the common electrodes 220 of the touch panel 10i overlap the scan lines SL, thereby reducing the parasitic capacitance between the scan lines SL and the touch electrodes 120.

Figure 12:
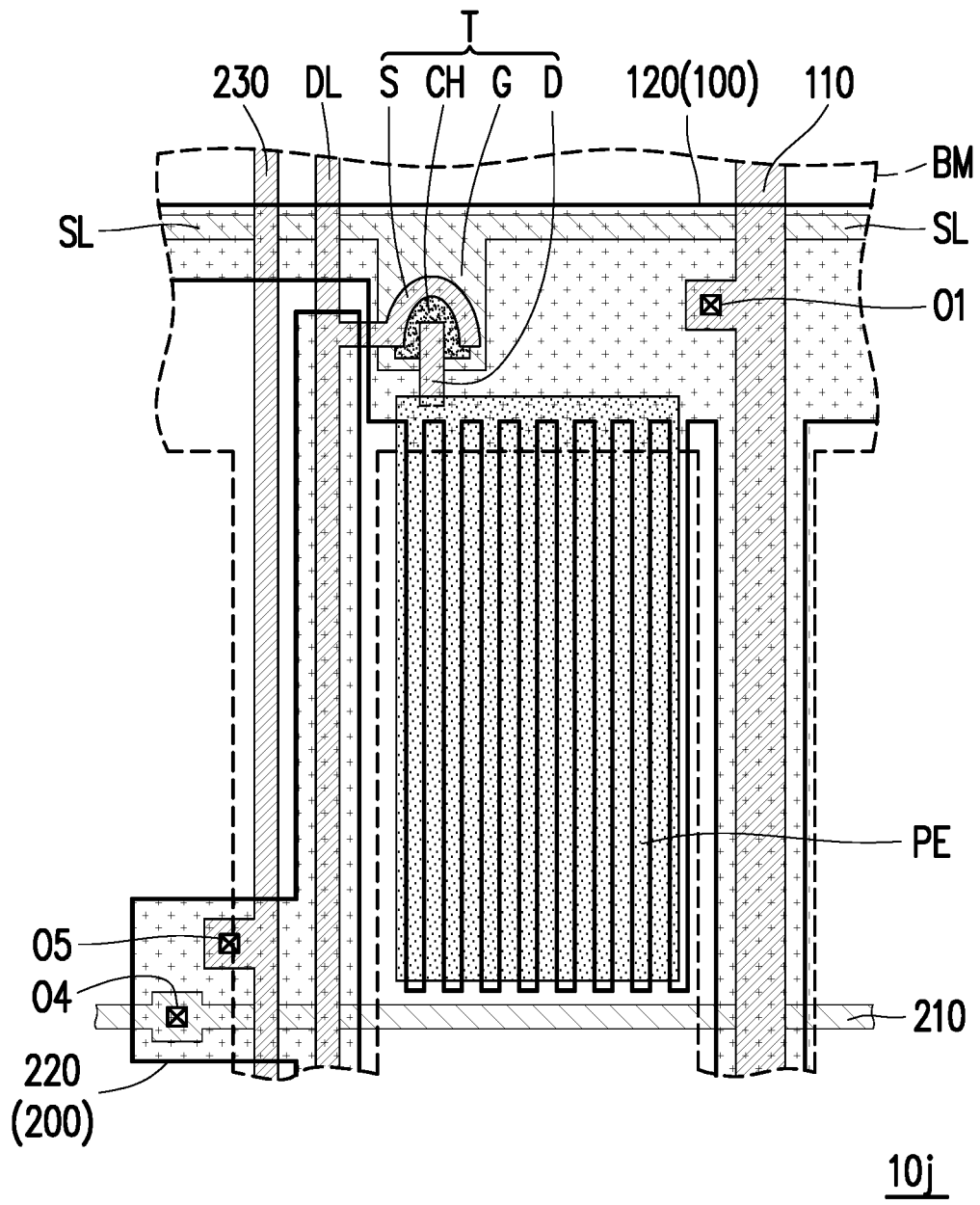
FIG. 12 is a schematic top view of a touch panel according to an embodiment of the disclosure.

FIG. 12 is a schematic top view of a touch panel according to an embodiment of the disclosure. Here, note that the reference numbers and some descriptions of the embodiment depicted in FIG. 12 follow those of the embodiment depicted in FIG. 8, the same or similar reference numbers serve to indicate the same or similar elements, and the same technical descriptions are omitted. Reference may be made to the previous embodiment for the omitted descriptions, and thus no redundant descriptions will be provided hereinafter.

The main difference between a touch panel 10j in FIG. 12 and the touch panel 10f in FIG. 8 lies in that the touch panel 10i further includes a plurality of second common signal lines 230 (one of the second common signal lines 230 is shown in FIG. 12).

With reference to FIG. 12, the common signal array 200 includes the first common signal lines 210, the common electrodes 220, and second common signal lines 230.

In the embodiment, the first common signal lines 210 and the scan lines SL belong to the same conductive layer. The first common signal lines 210 and the scan lines SL have the same extended direction (i.e., the first direction E1) and enable the adjacent common electrodes 220 in the first direction E1 to be electrically connected. In the embodiment, the second common signal lines 230 and the data lines DL belong to the same conductive layer. The second common signal lines 230 and the data lines DL have the same extended direction (e.g., the second direction E2) and enable the adjacent common electrodes 220 in the second direction E2 to be electrically connected.

The common electrodes 220 are electrically connected to first common signal lines 210 and the second common signal lines 230 through openings O4 and O5. The first common signal lines 210 and the second common signal lines 230 are electrically connected to each other. For instance, the first common signal lines 210 and the second common signal lines 230 are electrically connected to each other through the common electrodes 220. The number of the sub-pixels overlapped by common signal array 200 is greater than the number of the sub-pixels overlapped by each of the touch electrode groups 100.

In view of the above, the common electrodes 220 of the touch panel 10j overlap the data lines DL, thereby reducing the parasitic capacitance between the data lines DL and the touch electrodes 120.

Figure 13:
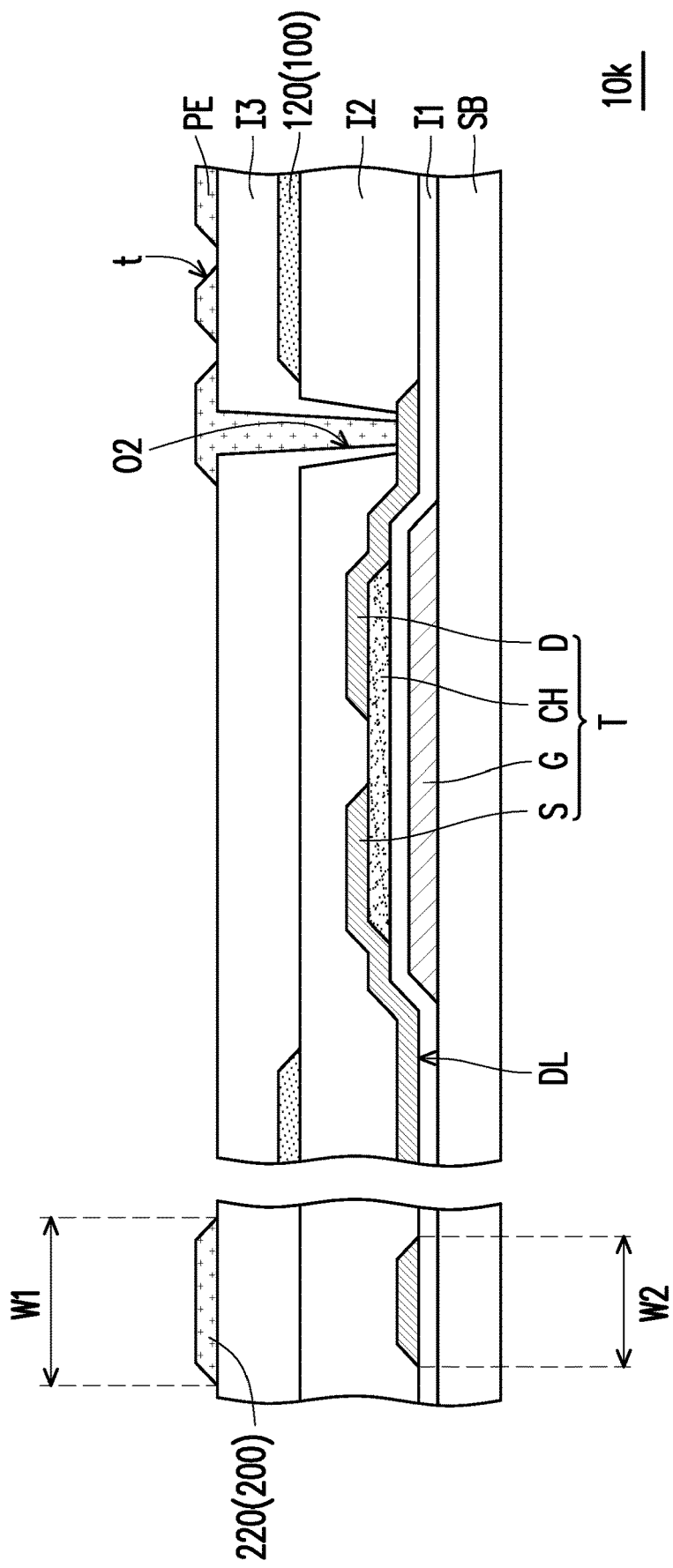
FIG. 13 is a schematic cross-sectional view of a touch panel according to an embodiment of the disclosure.

FIG. 13 is a schematic cross-sectional view of a touch panel according to an embodiment of the disclosure. Here, note that the reference numbers and some descriptions of the embodiment depicted in FIG. 13 follow those of the embodiment depicted in FIG. 4B, the same or similar reference numbers serve to indicate the same or similar elements, and the same technical descriptions are omitted. Reference may be made to the previous embodiment for the omitted descriptions, and thus no redundant descriptions will be provided hereinafter.

The main difference between a touch panel 10k in FIG. 13 and the touch panel 10b in FIG. 4B lies in that the touch electrodes 120 of the touch panel 10k are located between the pixel electrodes PE and the substrate SB.

With reference to FIG. 13, in the embodiment, the pixel electrodes PE and the common electrodes 220 are located on the dielectric layer I3. The touch electrodes 120 are located between the dielectric layer I3 and the dielectric layer I2, and the pixel electrodes PE overlap the touch electrodes 120. In the embodiment, the pixel electrodes PE include a plurality of slits t overlapping the touch electrodes 120.

In view of the above, the common electrodes 220 of the touch panel 10k overlap the data lines DL, thereby reducing the parasitic capacitance between the data lines DL and the touch electrodes 120.

It will be apparent to those skilled in the art that various modifications and variations can be made to the disclosed embodiment without departing from the scope or spirit of the disclosure. In view of the foregoing, it is intended that the disclosure covers modifications and variations provided that they fall within the scope of the following claims and their equivalents.

What is claimed is:
1. A touch panel, comprising:
a substrate;
a plurality of touch signal lines, located on the substrate;
a plurality of sub-pixels, located on the substrate, each of the sub-pixel comprising:
  a switch element, electrically connected to a corresponding scan line and a corresponding data line; and
  a pixel electrode, electrically connected to the switch element;
a plurality of touch electrode groups, comprising a plurality of touch electrodes, wherein each of the pixel electrodes is overlapping with a corresponding touch electrode in a direction perpendicular to a top surface of the substrate, and each of the touch electrode groups is electrically connected to at least one corresponding touch signal line of the touch signal lines; and at least one common signal array, comprising a plurality of common electrodes, wherein each of the common electrode overlaps at least one of the corresponding scan line and the corresponding data line, and the number of the sub-pixels overlapped by the at least one common signal array is greater than the number of the sub-pixels overlapped by each of the touch electrode groups.

2. The touch panel according to claim 1, wherein the touch signal lines and the corresponding scan lines belong to a first conductive layer.

3. The touch panel according to claim 1, wherein the touch signal lines and the corresponding data lines belong to a second conductive layer.

4. The touch panel according to claim 1, wherein a width of a region where at least one of the common electrodes overlaps the corresponding data line is greater than a width of the corresponding data line.

5. The touch panel according to claim 1, wherein in each of the sub-pixels, an area of a region where the corresponding data line overlaps one of the common electrode accounts for 14%-100% of an area of the corresponding data line.

6. The touch panel according to claim 1, wherein the at least one common signal array and the touch electrode groups are structurally separated from each other, and the at least one common signal array and the touch electrode groups are electrically connected to a driving circuit, respectively.

7. The touch panel according to claim 6, wherein the common electrodes are electrically connected to each other.

8. The touch panel according to claim 7, wherein the touch electrode groups are electrically connected to a plurality of first signal output terminals of the driving circuit, the at least one common signal array is electrically connected to at least one second signal output terminal of the driving circuit, and the number of the at least one second signal output terminal is less than the number of the first signal output terminals.

9. The touch panel according to claim 1, wherein the touch electrodes overlap the switch elements.

10. The touch panel according to claim 1, wherein each of the common electrodes comprises a first portion and a second portion perpendicular to the first portion.

11. The touch panel according to claim 10, where the second portions of parts of the common electrodes are located on a first side of the first portions, and the second portions of the other parts of the common electrodes are located on a second side of the first portions.

12. The touch panel according to claim 1, wherein the common electrodes and the pixel electrodes belong to a same conductive layer.

13. The touch panel according to claim 1, wherein the common electrodes and the touch electrodes belong to a same conductive layer.

14. The touch panel according to claim 1, wherein a material of the common electrodes and the touch electrodes comprises a transparent conductive material.

15. The touch panel according to claim 1, further comprising:

a plurality of bridge conductive wires, wherein extension directions of the bridge conductive wires and extension directions of the common electrodes are staggered, and the bridge conductive wires are electrically connected to the touch electrodes.

16. The touch panel according to claim 15, wherein each of the bridge conductive wires overlaps the corresponding scan line.

17. The touch panel according to claim 1, wherein the at least one common signal array further comprises:

a plurality of first common signal lines; and a plurality of second common signal lines, wherein extension directions of the second common signal lines and extension directions of the first common signal lines are staggered, and the common electrodes are electrically connected to the first common signal lines and the second common signal lines.

18. The touch panel according to claim 1, wherein each of the touch electrodes comprises a plurality of slits, and the slits overlap the pixel electrodes.

19. The touch panel according to claim 1, wherein in each of the touch electrode groups, the touch electrodes adjacent in a first direction are directly connected, and the touch electrodes are separated from each other in a second direction, wherein the first direction and the second direction are staggered, and the touch electrodes in the second direction are electrically connected to by at least one of the corresponding touch signal lines.

20. The touch panel according to claim 1, wherein the common electrodes are not overlapping with the pixel electrode in each of the sub-pixels.

* * * * *